United States Patent

Gerow

[15] 3,642,569
[45] Feb. 15, 1972

[54] LAMINAR STRUCTURES OF POLYIMIDES

[72] Inventor: Clare William Gerow, Buffalo, N.Y.
[73] Assignee: E. I. du Pont de Nemours and Company, Wilmington, Del.
[22] Filed: July 3, 1969
[21] Appl. No.: 839,056

[52] U.S. Cl. .............................. 161/189, 161/208, 161/227
[51] Int. Cl. ...................................... H01b 3/30, B32b 27/28
[58] Field of Search .......................... 161/189, 227, 206, 208

[56] References Cited

UNITED STATES PATENTS

| 3,542,639 | 11/1970 | Manino | 161/208 X |
| 3,567,504 | 3/1971 | Hopkins et al. | 161/189 X |
| 3,575,787 | 4/1971 | Pietrocini et al. | 161/189 X |

Primary Examiner—Harold Ansher
Attorney—Claude L. Beaudoin

[57] ABSTRACT

A laminar article is provided of a layer of a polyimide and a layer of a fluorinated polymer, which structure is suitable in the form of narrow tapes for electrical insulation uses, the laminated article is characterized by improved bond strength achieved by using alpha-chloromethylphenyltrialkoxysilane as either a priming solution on the polyimide or in the layer of the fluorinated polymer.

9 Claims, No Drawings

LAMINAR STRUCTURES OF POLYIMIDES

THE INVENTION

The present invention relates to laminar structures and a method of manufacture thereof. More particularly, the present invention is directed to improvements in and relating to laminar articles of polyimides and fluorinated polymeric materials and to a method of manufacture thereof.

Laminar articles of polyimide polymeric materials and fluorocarbon polymers are known articles of manufacture desirable for many diverse uses because characterized by a unique combination of physical properties not separately possessed by each individual constituent material thereof. The main drawback of such laminar structures resides in the lack of sufficient bond strength and durability when exposed to environments of high moisture content. For instance, U.S. Pat. No. 3,179,634 describes laminar structure of polyimide and fluoropolymer wherein the composite is formed by treating the surface of a self-supporting film of a tetrafluoroethylene/hexafluoropropylene copolymer with an electrical discharge to improve surface adhereability, coating the treated film by solvent-casting thereon a polyamide-acid precursor of the desired polyimide, and then converting the polyamide-acid layer to polyimide by treatment with acetic anhydride and pyridine, followed by solvent removal in a vacuum oven at 100° C. A major drawback of such structures resides in the lack of adequate bond strength when exposed to moisture. It is, therefore, the principal object of the present invention to provide a novel laminar structure of polyimide and fluorocarbon polymeric materials characterized by improved bond strength especially when exposed to water or high moisture containing environments.

According to the present invention there is provided a laminar structure comprising a layer of a polyimide and a layer of a fluorocarbon polymeric material characterized by improved bond strength and durability when exposed to environments of high moisture content. The laminar structure preferably comprises a layer of polyimide and a layer of a copolymer of hexafluoropropylene and tetrafluoroethylene. In another embodiment, the laminar structure comprises a layer of polyimide and a layer of a copolymer of between about 5 percent and about 50 percent by weight, based upon the total copolymer weight, of hexafluoropropylene and between about 50 percent and about 95 percent by weight, based upon the total copolymer weight, of tetrafluoroethylene.

According to the present invention, there is further provided a method of manufacture for making laminar structures which comprises coating a base film structure of polyimide on at least one side with a fluorocarbon polymer composition which contains an alpha-chloromethylphenyltrialkoxysilane or its hydrolyzed condensate, and heating between about 325° C. and about 500° C. in order to dry and sinter the coating. The fluoroethylenepropylene polymer composition may be in either aqueous dispersion or in organic dispersion (organosol) form. The former is the preferred process. If desired, the alpha-chloromethylphenyltrialkoxysilane may be applied by priming a base film of polyimide on at least one side with a solution of an alpha-chloromethylphenyltrialkoxysilane in a medium which is partly water, drying the primed polyimide film, and then applying to at least one such primed surface an aqueous fluoroethylenepropylene polymer dispersion, followed by drying and sintering the coating of fluoroethylenepropylene polymer.

The laminar structure of the invention is characterized by at least one layer of a polyimide of the following recurring structural unit:

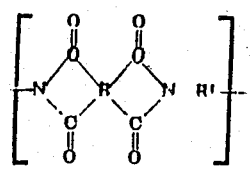

where R is a tetravalent aromatic organic radical including the following and substituted derivatives thereof:

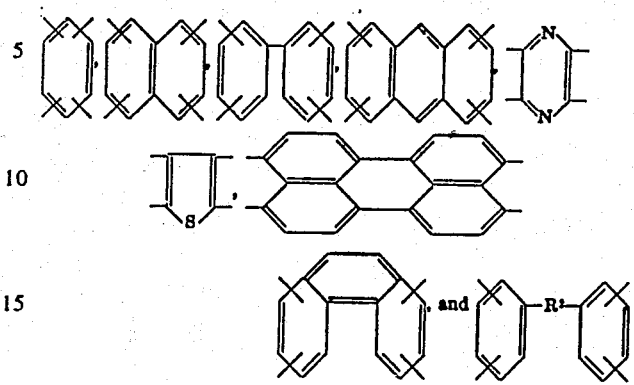

where $R^2$ is alkylene of 1-3 carbon atoms, oxygen, sulfur, or one of the following:

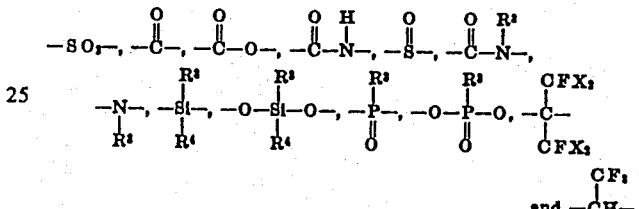

wherein $R^3$ and $R^4$ are alkyl or aryl, and substituted groups thereof, and each X is separately chosen from the group consisting of F and Cl, the said R being such as obtained from a dianhydride of the formula

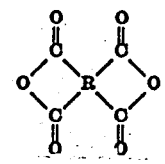

where R has the same meaning as above; and where $R^1$ is a divalent aromatic radical (arylene), preferably one of the following groups: phenylene, naphthylene, biphenylene, anthrylene, furylene, benzfurylene, and

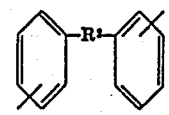

wherein $R^2$ is as defined above. The $R^1$ groups are conveniently derived from organic diamines having the formula $H_2N-R^1-NH_2$ where $R^1$ is as above defined. In such R radicals indicated hereinabove having free valencies shown in indefinite positions, the free valencies are so disposed that there are two pairs of valencies, each pair being either ortho or peri.

Suitable polyimides for the laminar structure of the prevent invention include such as are derived from the following dianhydrides:
pyromellitic dianhydride;
3,4,9,10-perylenetetracarboxylic dianhydride;
naphthalene-2,3,6,7-tetracarboxylic dianhydride;
naphthalene-1,4,5,8-tetracarboxylic dianhydride;
bis(3,4-dicarboxyphenyl) ether dianhydride;
bis(3,4-dicarboxyphenyl) sulfone dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;

benzene-1,2,3,4-tetracarboxylic dianhydride;
thiophene-2,3,4,5-tetracarboxylic dianhydride;
2,3,2',3'-benzophenonetetracarboxylic dianhydride;
3,4,3',4'-benzophenonetetracarboxylic dianhydride;
benzoylpyromellitic dianhydride;
6-(3',4'-dicarboxybenzoyl)-2,3-naphthalene dicarboxylic dianhydride;
4'-(3'',4''-dicarboxybenzoyl)-3,4-diphenyl dicarboxylic dianhydride;
4-(3',4'-dicarboxybenzoyloxy)phthalic dianhydride;
4-(3',4'-dicarboxybenzamido)phthalic dianhydride;
bis(3,4-dicarboxyphenyl)sulfide dianhydride;
bis(2,3-dicarboxyphenyl)methane dianhydride;
bis(3,4-dicarboxyphenyl)methane dianhydride;
1,1-bis(2,3-dicarboxyphenyl)ethane dianhydride;
1,1-bis(3,4-dicarboxyphenyl)ethane dianhydride;
2,2-bis(2,3-dicarboxyphenyl)propane dianhydride;
2,2-bis(3,4-dicarboxyphenyl)propane dianhydride;
2,2-bis(3,4-dicarboxyphenyl)-1,1,1-trifluoroethane dianhydride;
2,2-bis(3,4-dicarboxyphenyl)hexafluoropropane dianhydride;
2,2-bis(3,4-dicarboxyphenyl)-1-chloro-1,1,3,3,3-pentafluoropropane dianhydride;
2,2-bis(3,4-dicarboxyphenyl)-1,3-dichloro-1,1,3,3-tetrafluoropropane dianhydride;
2,2-bis(3,4-dicarboxyphenyl)-1,1,3,3-tetrachloro-1,3-difluoropropane dianhydride;
position isomers of the above, etc., and mixtures thereof.

Suitable polyimides for the laminar structure of the present invention also include such as are derived from the following diamines:
meta-phenylenediamine;
para-phenylenediamine;
2,2-bis(4-aminophenyl)propane;
4,4'-diaminodiphenylmethane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
bis(3-aminophenyl)diethyl silane;
benzidine;
3,3'-dichlorobenzidine;
3,3'-dimethoxybenzidine;
4,4'-diaminobenzophenone;
N,N-bis(4-aminophenyl)-n-butylamine;
N,N-bis(4-aminophenyl)methylamine;
1,5-diaminonaphthalene;
3,3'-dimethyl-4,4'-diaminobiphenyl;
m-aminobenzoyl-p-aminoanilide;
4-aminophenyl 3-aminobenzoate;
1,1-bis(4-aminophenyl)ethane;
4,4'-diaminodiphenyl sulfoxide;
3,3'-diaminobenzophenone;
2,2'-diaminobenzophenone;
2,2-bis(4-aminophenyl)hexafluoropropane;
2,2-bis(4-aminophenyl)-1,3-dichloro-1,1,3,3-tetrafluoropropane;
N,N-bis(4-aminophenyl)aniline;
2,4-bis(beta-amino-t-butyl)toluene;
bis(p-beta-amino-t-butylphenyl)ether;
p-bis-2-(2-methyl-4-aminopentyl)benzene;
p-bis(1,1-dimethyl-5-aminopentyl)benzene;
m-xylylenediamine;
p-xylylenediamine;
position isomers of the above, etc., and mixtures thereof.

The polyimides and polyamide-acids are more fully described in patents such as U.S. Pat. Nos. 3,179,614 and 3,179,634. The thickness of the polyimide layer is between about 0.25 mil and about 5 mils, preferably between 0.5 and 2.0 mils.

The laminar structure of the invention is further characterized by a layer of a fluorocarbon polymeric material. The expressions "fluorocarbon polymer" and "fluorocarbon polymeric material" as used herein mean polytetrafluoroethylene (TFE) and copolymers of tetrafluoroethylene and hexafluoropropylene (FEP). The fluorocarbon polymers are extensively described in such patents as U.S. Pat. No. 2,833,686; 2,946,763; and 3,051,683. The layer of fluorocarbon polymer is preferably a copolymer of between about 50 percent and about 95 percent tetrafluoroethylene and between about 5 percent and about 50 percent of hexafluoropropylene, especially wherein the amount of hexafluoropropylene is between about 7 percent and about 27 percent. Optionally, the fluorocarbon polymer layer may be blended with up to 95 percent by weight (of the total weight of the two polymers) of a homopolymer of tetrafluoroethylene, such as that described by Berry in U.S. Pat. Nos. 2,559,750 and 2,559,752. The thickness of the fluorocarbon polymer layer is preferably between about 0.05 mil and about 0.3 mil. The fluorocarbon polymer(s) may be employed as a dispersion in either an aqueous or an organic solvent medium. Aqueous dispersions of the fluorocarbon polymer are commercially available under the trade name of Teflon fluorocarbon polymer dispersions. They are also described in the patents cited above. Dispersions in organic solvent media, also known as organosols, are described in copending applications U.S. Ser. Nos. 738,817 and 738,818, both filed on June 21, 1968, and of common assignee with this application, both being now abandoned.

A salient feature of the present invention resides in the manner whereby the polyimide layer and the fluorocarbon polymer layer are united to provide a unitary laminar structure. This is accomplished by employing an alpha-chloromethylphenyltrialkoxysilane. The alkoxy groups may be methoxy, ethoxy and propoxy. Either purified or technical grades of the silane are suitable for use. The technical grade is thought to contain, in addition, tolyltrialkoxysilane and alpha, alpha-dichloromethylphenyltrialkoxysilane, and also compounds with aromatically bound chlorine, i.e., tolyltrialkoxysilanes where a chlorine atom replaces a hydrogen atom attached to the benzene ring. The chloromethyl substituent may be attached to the benzene ring ortho, meta or para to the bond from the benzene ring to the silicon atom.

The alpha-chloromethylphenyltrialkoxysilane may be employed either as such, or as its condensed siloxane hydrolysate. It is preferred to use the siloxane hydrolysate as smaller amounts are found to be effective, as compared to the amount of unhydrolyzed material needed for best results. The hydrolysate is made simply by placing the alpha-chloromethylphenyltrialkoxysilane in a medium which is wholly or partly water, usually with an acid catalyst, such as acetic acid, present to promote the rate of hydrolysis. The siloxane hydrolystate is of a highly complex nature, comprising a variety of cyclic, linear and branched condensation products, as is known to those skilled in the art. Hydrolysis need not be complete; partial hydrolysis products are also effective. The siloxane hydrolysate may be primed onto the base film before coating the fluoropolymer dispersion onto it, or the hydrolysate may be added to the fluoropolymer dispersion before it is coated onto the base film. The (unhydrolyzed) silane may be added to an organosol of the fluoropolymer before coating it onto the base film.

When the silane is employed in the preferred process by adding it to an aqueous fluorocarbon polymer dispersion coating bath, between about 0.5 percent and about 10 percent by weight of the silane, based on the weight of fluorocarbon polymer composition, has been found suitable for use. THe coating bath is then applied, dried and coalesced by heating between about 325° C. and about 500° C. When used in this way, it is preferred to use about 0.5 to 2 percent by weight of the alpha-chloromethylphenyltrialkoxysilane, based on the weight of fluorocarbon polymer. When used in this way, the alpha-chloromethylphenyltrialkoxysilane, of course, will be distributed throughout the coating and at the interface of the coating and base sheet.

When the silane is employed by first priming it onto the base polyimide sheet, this step can be done by any of the standard priming methods, such as dipping, kiss coating, gravure roll, spraying, etc. All such methods are satisfactory for two-side priming, and all but dipping are suitable for one-side priming. After application of the primer solution, the film may be contacted with wiper rods or rolls to remove any excess not desired before the solvent is removed in the drying operation. Primer solutions containing about 0.5 to 10 percent by volume of the silane have been found suitable for use in priming. Solutions containing markedly less than 0.5 percent incur an economic penalty because of the large amount of solvent used and/or the burden in removing the solvent during drying; further, unless excessively large amounts of such dilute solution are used, the degree of improvement in high humidity adhesion is not as great as desired. Use of solutions containing markedly more than 10 percent frequently results in application of amounts of primer greater than what is needed, and is uneconomic. Solutions containing about 0.5 to 2 percent by volume of the silane are preferred. The solvent employed as the medium for the silane primer can be all water or a mixture of water and a low molecular weight alcohol, such as ethanol, methanol or isopropyl alcohol. The temperature required to dry the film in the priming step will vary depending on the specific solvents to be removed. Temperatures as low as about 130° C. are suitable for removing alcohols, and as high as 325° C. are permissible for removing water.

The base polyimide film may be treated on either one or both sides with the silane primer. The one-side primed film is subsequently coated on the primed side with fluoroethylenepropylene polymer. The two-side primed base film, however, may subsequently be coated on either one or both sides with fluoroethylenepropylene polymer. Whereas the coated side of the one-side primed/one-side coated film cannot be sealed to the uncoated side, the coated side of two-side primed/one-side coated film can be sealed to the uncoated (but primed) side.

Whichever of the two methods described immediately above for employing the silane is used, the fluoropolymer layer is conveniently applied to the base layer as an aqueous polymer dispersion. More specifically, the fluoropolymer can be applied to the base layer as a layer about 0.02 to 1.0 mil and preferably 0.04 to 0.3 mil thick of an aqueous dispersion of a colloidal copolymer of hexafluoropropylene and tetrafluoroethylene, said copolymer having a hexafluoropropylene content of 5 to 50 weight percent, and preferably 7 to 27 weight percent, and a specific melt viscosity of 1,500 to 300,000 poises, said dispersion having a solids content in the range of about 5 to 65 percent, at a temperature in the range of from about room temperature up to about 60° C., and heating the composite article at a temperature in the range of from about 325° to 500° C. and preferably 370° to 450° C. for a period of about 0.25 to 15 minutes and preferably 0.5 to 3 minutes. Optionally, the colloidal hexafluoropropylene/tetrafluoroethylene copolymer can be blended therewith up to about 95 percent on a polymer weight basis of colloidal polytetrafluoroethylene, the solids content of the aqueous dispersion being in the range of about 5 to 65 percent.

When the silane is employed by adding it to an organosol of a fluorocarbon polymer, about 5 to 10 percent by weight of the silane, based on the weight of fluorocarbon polymer, has been found suitable for use. The coating bath is then applied, dried and coalesced by heat in the usual way.

The improved product of this invention possesses a bond between the polyimide and fluoroethylenepropylene polymer layers which is markedly improved over that of composites without the silane primer, when exposed to high-humidity conditions. The adhesion between the layers of the novel composite, as prepared and under low humidity conditions, is comparable to that of composites without the silane primer. But on exposure of the composite of this invention to water or high humidity, the adhesive strength between layers remains at a significantly higher level than that of composites without the primer. More specifically, both composites without the primer and those with the silane primer have heat-seal strengths, as prepared, in the range of about 800 to 1,400 grams per inch. However, if the heat-sealed films are immersed in boiling water before testing, it is found that those with silane primer have heat-seal strengths as high as 600 to 800 grams per inch after 4 hours immersion, while those without primer have decreased to only 200 to 300 grams per inch in only 2 to 3 hours.

The improved adhesion of the product of this invention is also evidenced by its better retention of heat-seal strength upon aging at high temperatures. In this test, samples of heat-sealed films are aged in air in ovens heated at either 200° C. or 250° C. under ambient relative humidity. At arbitrary intervals samples are removed and the heat-seal strengths are tested. Again it is found that while the initial seal strengths of composites both with and without the added silane are comparable, those containing the silane are markedly superior to those without it after high-temperature aging. For example, upon aging at 200° C., while films made with the silane exhibit heat-seal strengths in the range of 500 to 800 grams/inch after 70 to 90 days aging, those without the silane have decreased in seal strength to below 400 grams/inch after only 10 to 15 days aging.

The principle and practice of the present invention will now be illustrated by the following examples which are provided to show the practice and use thereof.

The test samples of the laminar structures prepared in the following examples were evaluated in accordance with the following testing procedure:

Heatseal strength is measured by cutting a piece of the laminar film test sample of 4 inches by 10 inches, with the grain of the film running in the long or machine direction, into two pieces each of 4 inches by 5 inches. The two test pieces are placed in superposed relation so that opposing fluoropolymer surfaces thereof are in contact. The superimposed films are then sealed together at each end at right angles to the grain of the film by means of a ¾-inch-wide sealing bar that is heated to a temperature of 350° C. and contacts the film ends at 20 p.s.i. pressure for 30 seconds. The sealed test samples are then cut in half at right angles to the grain of the film, and the two resulting pieces are each cut along their centerline and parallel to the grain of the film to provide 1 inch wide strips. The resulting four sets of strips are tested for heat-seal strength by securing the free ends thereof in a Suter testing machine and pulling the test samples apart. The highest force in grams required to pull the strips apart is taken as a measure of the heat-seal bond strength.

EXAMPLES 1–4

Pieces of 1-mil-thick film of the polypyromellitimide of bis(4-aminophenyl) ether were coated with one of several different coating baths by dipping the film in the appropriate coating bath, removing it, permitting it to drain briefly, air-drying it at room temperature, and then heating it at 400° C. for 5 minutes.

The materials used in making up the coating baths were as follows: Fluorocarbon polymer dispersion "A" was a commercially available aqueous dispersion containing 54.4 percent by weight solids; the polymer is a copolymer of tetrafluoroethylene and hexafluoropropylene known as Teflon fluorocarbon polymer FEP-120, and the dispersion contains a stabilizing surfactant. Fluorocarbon polymer dispersion "B" was dispersion "A" diluted with water to 20 percent by weight solids, and in addition contained 0.1 percent by weight of Carbopol 960 surfactant. The alpha-chloromethylphenyltrimethoxysilane used was a technical grade which contained some tolyltrimethoxysilane and alpha, alpha-dichloromethylphenyltrimethoxysilane.

The coating bath of Example 1 was prepared as follows: To a mixture of 4.5 ml. of isopropyl alcohol, 3.6 ml. of water and 1 drop of glacial acetic acid was added 0.8 ml. of alpha-chloromethylphenyltrimethoxysilane slowly with stirring. This mixture was then slowly stirred into a mixture of 147 g. of polymer dispersion "A" and 245 ml. of water. The resulting dispersion coating bath contained 20 percent by weight of FEP polymer and 1 percent by weight (based on the FEP polymer) of the silane.

The coating bath of Example 2 was prepared as follows: To a mixture of 4.5 ml. of isopropyl alcohol, 3.6 ml. of water and 1 drop of glacial acetic acid was added 0.8 ml. of alpha-chloromethylphenyltrimethoxysilane slowly with stirring. This mixture was slowly stirred into 400 g. of polymer dispersion "B." The resulting dispersion coating bath contained 19.6 percent by weight FEP and 1 percent by weight (based on the FEP polymer) of the silane.

The coating bath of Example 3 was prepared as follows: To a mixture of 22.5 ml. of isopropyl alcohol, 18 ml. of water and 5 drops of glacial acetic acid was added 4 ml. of alpha-chloromethylphenyltrimethoxysilane slowly with stirring. This mixture was slowly stirred into 400 g. of polymer dispersion "B." The resulting dispersion coating bath contained 18.2 percent by weight FEP and 5 percent by weight (based on the FEP polymer) of the silane.

The coating bath of Example 4 was prepared as follows: To a mixture of 45 ml. of isopropyl alcohol, 36 ml. of water and 10 drops of glacial acetic acid was added 8 ml. of alpha-chloromethylphenyltrimethoxysilane slowly with stirring. This mixture was slowly stirred into 400 g. of polymer dispersion "B." The resulting dispersion coating bath contained 16.3 percent by weight FEP and 10 percent by weight (based on the FEP polymer) of the silane.

Fluorocarbon polymer dispersion "B" was used as a control coating bath.

Samples of each type of film were heat sealed at 350° C. under 20 p.s.i. for 30 seconds dwell time. The samples were tested by both boiling water and humidity cycling tests. In the boiling water test the samples were simply placed in boiling water and removed after various periods of time for testing the heat-seal strength.

In the humidity cycling test the heat-sealed film samples are placed in an oven at 71° ±2° C. with a relative humidity of 95 ±5 percent; after 6 hours under these conditions, the oven is allowed to cool to 38° C. or lower for 16 hours; heat is again supplied over a 2-hour period to again reach a temperature of 71° C.; the 16-hour cooling/8-hour heating cycles are continued, and samples are taken at various arbitrary intervals for measurement of the seal strength.

The results of these tests are summarized in Table I below.

TABLE I

[Heat-seal durability in moist environments of polyimide film coated with FEP fluorocarbon resin (aqueous dispersion) containing chloromethylphenyltrimethoxysilane]

| Example | 1 | 2 | 3 | 4 | Control |
|---|---|---|---|---|---|
| Percent FEP in dispersion | 20 | 19.6 | 18.2 | 16.3 | 20 |
| Percent silane (based on FEP) | 1 | 1 | 5 | 10 | 0 |
| Percent Carbopol 960 (based on total weight) | 0 | 0.1 | 0.1 | 0.1 | 0.1 |
| Initial peel strength (grams/inch) | 775 | 1,270 | 860 | 830 | 1,325 |
| Peel strength after boiling: | | | | | |
| 1 hour | | | | | |
| 2 hours | 760 | 970 | 770 | 840 | 490 |
| 3 hours | 660 | 880 | 820 | 800 | 290 |
| 4 hours | 640 | 800 | 685 | 810 | 210 |
| Peel strength after humidity cycling, days: | 640 | 740 | 790 | 770 | 180 |
| 4 | | | | | |
| 7 | 665 | 890 | 770 | 690 | 210 |
| 11 | 580 | 710 | 770 | 610 | 110 |
| 17 | 560 | 640 | 680 | 630 | 75 |
| 21 | 490 | 600 | 735 | 505 | |
| | 530 | 550 | 740 | 550 | |

EXAMPLES 5–8

In preparation for the four different dispersion coating baths of these examples, the following four mixtures were made from technical grade alpha-chloromethylphenyl-trimethoxysilane.

For Example 5: To 101 ml. (81 g.) of isopropyl alcohol, 81 ml. of water and a few drops of glacial acetic acid was added 18 g. of the silane slowly with stirring.

For Example 6: To 202 ml. (162 g.) of isopropyl alcohol, 162 ml. of water and a few drops of glacial acetic acid was added 36 g. of the silane slowly with stirring.

For Example 7: To 405 ml. (324 g.) of isopropyl alcohol, 324 ml. of water and a few drops of glacial acetic acid was added 72 g. of the silane slowly with stirring.

For Example 8: To 1,024 ml. (819 g.) of isopropyl alcohol, 819 ml. of water and a few drops of glacial acetic acid was added 182 g. of the silane with stirring.

To 25.5 lbs. of water was slowly added 18 g. of Carbopol 960 surfactant and the mixture was stirred until the Carbopol dissolved; then 14.5 lbs. of fluorocarbon polymer dispersion "A" was added and the mixture was stirred until uniform. Four such batches were made, one for each example. The silane mixtures prepared above were each added to a batch of this fluorocarbon polymer dispersion and again stirred until uniform. The four coating baths thus contained 0.5 percent, 1.0 percent, 2.0 percent and 5.0 percent by weight (based on the FEP polymer) of the silane.

Continuous rolls of 1-mil film of the polypyromellitimide of bis(4-aminophenyl) ether were coated on both sides with one of the four coating bath described above, and the coating was dried and sintered at 450°–460° C. The resulting film was about 1.2 mils thick.

Samples of each coated film were heat sealed at 350° C. under 20 p.s.i. for 10 seconds dwell time. The films were evaluated in the humidity cycling test described above. The results are summarized in Table II below.

TABLE II

| Example | 5 | 6 | 7 | 8 |
|---|---|---|---|---|
| Percent silane (based on FEP) | 0.5 | 1.0 | 2.0 | 5.0 |
| Initial peel strength (grams/inch) | 1,140 | 973 | 761 | 888 |
| Peel strength after humidity cycling, days: | | | | |
| 6 | 391 | 485 | 238 | 158 |
| 10 | 198 | 436 | 128 | 145 |
| 14 | 168 | 298 | 112 | 148 |
| 17 | 190 | 253 | 125 | 140 |

The film of Example 6, prepared from a coating bath to which 1 percent of the silane was added, was the best of this series, and was better than film similarly coated but containing no silane.

The films of Examples 5 and 6 were tested by aging in air at 200° C. and 250° C. under ambient relative humidity. They were compared against a similarly constituted control film made without the silane. The results are given in Tables III and IV below.

TABLE III

| Example | 5 | 6 | Control |
|---|---|---|---|
| Initial heat-seal strength (grams/inch, 916 | | | |
| Heat-seal strength after aging at 200° C. for | | | |
| 6 days | 995 | 900 | |
| 7 | | | 433 |
| 15 | | | |
| 17 | 880 | 851 | 297 |
| 25 | | | 385 |
| 28 | | | |
| | 751 | | |
| 35 | | 756 | |
| 38 | | | 266 |
| 45 | 672 | 770 | |
| 48 | | | 198 |
| 55 | 677 | 698 | |
| 59 | | | 220 |
| 65 | 560 | 683 | |
| 73 | | | 202 |
| 81 | 568 | 600 | |
| 82 | | | 175 |
| 91 | 537 | 588 | |
| 94 | | | 128 |
| | 447 | 537 | |

TABLE IV

| Example | 5 | 6 | Control |
|---|---|---|---|
| Initial heat-seal strength grams/inch) | 916 | 998 | 1157 |

| Heat-seal strength after aging at 250° C. for | | |
|---|---|---|
| 6 days | 860 | 676 |
| 7 | | 494 |
| 15 | | 350 |
| 17 | 743 | 625 |
| 25 | | 331 |
| 28 | 563 | 466 |
| 35 | | 346 |
| 38 | 510 | 540 |
| 45 | | 268 |
| 48 | 560 | 443 |
| 55 | | 255 |
| 59 | 477 | 317 |
| 65 | | 197 |
| 73 | 342 | 423 |
| 82 | 357 | 312 |

EXAMPLE 9

A dispersion coating bath was prepared as follows: To 41 lbs. of water was slowly added 30 g. of Carbopol 960, and the mixture was stirred until the Carbopol dissolved. Then 24 lbs. of fluorocarbon polymer dispersion "A" was added and the mixture was stirred until uniform. To this was added a mixture prepared by slowly adding with stirring 59 g. of technical grade alpha-chloromethylphenyltrimethoxysilane to 332 ml. (266 g.) of isopropyl alcohol, 266 ml. of water and 0.5 ml. of glacial acetic acid, and the entire mixture was stirred until uniform. The dispersion coating bath contained 20 percent by weight FEP polymer and 0.1 percent by weight Carbopol 960 (based on total weight), and 1 percent of the silane (based on the weight of FEP).

Continuous rolls of 1-mil film of the polypyromellitimide of bis(4-aminophenyl) ether were coated on both sides in a coating tower having doctor rolls set at a 3-mil opening. Various film speeds and final drying temperatures were employed. Various specimens were heat sealed at 350° C. under 20 p.s.i. for 30 seconds dwell time, and evaluated by the humidity cycling test described above. The results are summarized in Table V below.

All six rolls of film had improved humidity resistance over film similarly prepared but without the added silane.

The films of Examples 9A through 9F were tested by aging in air at 200° C. and 250° C. under ambient relative humidity. They were compared against a similarly constituted control film made without the silane. The results are given in Tables VI and VII below.

EXAMPLE 10

To 2 ml. of water and 2.6 ml. of isopropyl alcohol was added glacial acetic acid dropwise until the solution had a pH of 3. Then 10 g. of a good grade of alpha-chloromethylphenyltrimethoxysilane was added slowly, and the mixture was stirred for 5 minutes. This mixture was added to 986 ml. of water to give a hazy dispersion containing 1 percent by weight of the hydrolyzed condensate of the silane.

Several pieces of 1-mil film of the polypyromellitimide of bis(4-aminophenyl) ether were primed with this dispersion and dried at 150° C. This primed film was then coated with

TABLE V

| Example | 9A | 9B | 9C | 9D | 9E | 9F |
|---|---|---|---|---|---|---|
| Film speed (feet/minute) | 60 | 51 | 46 | 39 | 10 | 10 |
| Final drying temp. (° C.) | 430–440 | 440–450 | 450–455 | 465–470 | 395–405 | 420–430 |
| Initial peel strength (grams/inch) | 863 | 1,035 | 1,060 | 847 | 1,077 | 872 |
| Peel strength after humidity cycling, days: | | | | | | |
| 3 | 551 | 628 | 616 | 592 | 726 | 351 |
| 7 | 348 | 468 | 530 | 433 | 596 | 333 |
| 10 | 372 | 432 | 398 | 290 | 500 | 203 |
| 15 | 271 | 341 | 371 | 216 | 498 | 208 |

TABLE VI

| Example | 9A | 9B | 9C | 9D | 9E | 9F | Control |
|---|---|---|---|---|---|---|---|
| Initial heat-seal strength (grams/inch) | 863 | 1,035 | 1,060 | 847 | 1,077 | 872 | 1,157 |
| Heat-seal strength after aging at 200° C. for, days: | | | | | | | |
| 7 | | | | | | | 433 |
| 10 | 1,086 | 1,066 | 1,012 | 607 | 1,038 | 378 | |
| 15 | | | | | | | 297 |
| 20 | 950 | 1,082 | 1,035 | 887 | 935 | 862 | |
| 25 | | | | | | | 385 |
| 30 | 892 | 935 | 817 | 382 | 892 | 698 | |
| 35 | | | | | | | 266 |
| 41 | 957 | 813 | 803 | 755 | 717 | 352 | |
| 45 | | | | | | | 198 |
| 55 | 890 | 732 | 734 | 362 | 723 | 595 | 220 |
| 64 | 670 | 758 | 702 | 542 | 757 | 385 | |
| 65 | | | | | | | 202 |
| 76 | | 726 | 608 | 583 | 770 | 560 | |

TABLE VII

| Example | 9A | 9B | 9C | 9D | 9E | 9F | Control |
|---|---|---|---|---|---|---|---|
| Initial heat-seal strength (grams/inch) | 863 | 1,035 | 1,060 | 847 | 1,077 | 872 | 1,157 |
| Heat-seal strength after aging at 250° C. for, days: | | | | | | | |
| 7 | | | | | | | 494 |
| 10 | 1,015 | 908 | 618 | 198 | 1,046 | 716 | |
| 15 | | | | | | | 350 |
| 20 | 912 | 893 | 827 | 365 | 1,048 | 173 | |
| 25 | | | | | | | 331 |
| 30 | 745 | 901 | 567 | 400 | 886 | 553 | |
| 35 | | | | | | | 346 |
| 41 | 673 | 080 | 565 | 208 | 863 | 188 | |
| 45 | | | | | | | 208 |
| 55 | 085 | 028 | 097 | 190 | 907 | 468 | 255 |
| 64 | 515 | 045 | 567 | 138 | 757 | 322 | |
| 65 | | | | | | | 197 |
| 76 | 503 | 573 | 420 | 216 | 566 | 338 | | fluorocarbon polymer dispersion "B" described above, and dried and coalesced for 5 minutes at 400° C. Samples of the coated film were heat-sealed at 350° C. under 20 p.s.i. for 30 seconds dwell time. The sealed specimens were tested in boiling water as described above. The test results are summarized in Table VIII below.

TABLE VIII

|  | Ave. | Range |
|---|---|---|
| Initial Peel Strength (grams/inch) | 1,170 | 1,130–1,240 |
| Peel Strength after Boiling: |  |  |
| 1 hour | 833 | 420–1,080 |
| 2 hours | 940 | 900–980 |
| 3 hours | 810 | 760–860 |
| 4 hours | 777 | 720–820 |
| 5 hours | 855 | 780–920 |

The primed and coated film was superior in boiling water resistance to similar film not primed before coating.

The primed and coated films also exhibited good resistance to degradation upon aging under high temperature. One heat-sealed specimen aged at 250° C. for 4 days had a peel strength of 821 grams/inch.

EXAMPLE 11

To 900 ml. of water and 950 ml. of isopropyl alcohol was added glacial acetic acid until the pH of the solution was 3. About 250 ml. of glacial acetic acid was required. To this solution was slowly added with stirring 200 g. of a good grade of alpha-chloromethylphenyltrimethoxysilane. The resulting hazy dispersion was stirred for 5 minutes and then was diluted with 18,000 ml. of water to give a 1 percent by weight dispersion of the condensed hydrolysate of the silane.

A roll of 1-mil film of the polypyromellitimide of bis(4-aminophenyl) ether was primed with the above dispersion, and coated with fluorocarbon polymer dispersion "B" described above, in a two-stage coating tower. In the first part of the coating apparatus the film was dipped into the above-described priming dispersion, then passed into a dryer maintained at 260° C. in order to dry it. The film passed over a cooling roll, then went into a dip-tank containing fluorocarbon polymer dispersion "B," passed between doctor rolls set with a 3-mil opening, and then went into another dryer maintained at 450° C. in order to dry the coating and coalesce the polymer. The whole operation was carried out at speeds in the range of 40 to 50 feet per minute.

Samples of film taken from near the start of the run and from the end of the run were heat-sealed at 350° C. under 20 p.s.i. for 30 seconds dwell time, and were evaluated by the boiling water test described above. The results are summarized in Table IX below.

TABLE IX

|  | Start of roll | End of roll |
|---|---|---|
| Initial Peel Strength (grams/inch) | 981 | 780 |
| Peel Strength after Boiling: |  |  |
| 1 hour | 633 | 427 |
| 2 hours | 441 | 273 |
| 3 hours | 338 | 256 |

This primed and coated film had better resistance to boiling water than similar film not primed before coating.

What is claimed is:

1. A laminar structure comprising a layer of a polyimide, a layer of a fluorocarbon polymeric material and alpha-chloromethylphenyltrialkoxysilane at the interface between the layers of polyimide and fluorocarbon polymeric material.

2. A laminar structure of claim 1 further comprising alpha-chloromethylphenyltrialkoxysilane dispersed throughout the layer of fluorocarbon polymeric material.

3. The laminar structure of claim 1 wherein the layer of polyimide is of a thickness between about 0.025 mil and about 5 mils.

4. The laminar structure of claim 2 wherein said fluorocarbon polymeric material is polytetrafluoroethylene.

5. The laminar structure of claim 3 wherein said layer of polytetrafluoroethylene is between about 0.05 mil and about 0.3 mil thick.

6. The laminar structure of claim 2 wherein said fluorocarbon polymeric material is a copolymer of hexafluoropropylene and tetrafluoroethylene.

7. The laminar structure of claim 5 wherein said copolymer is between about 5 percent and about 50 percent by weight, based upon the total copolymer weight, of hexafluoropropylene and between about 50 percent and about 95 percent by weight, based upon the total copolymer weight, of tetrafluoroethylene.

8. The laminar structure of claim 6 wherein the layer of said copolymer is between about 0.05 mil and about 0.3 mil thick.

9. The laminar structure of claim 7 wherein said polyimide is of the following recurring structural unit:

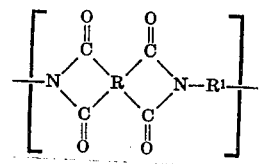

where R is a tetravalent aromatic organic radical including the following and substituted derivatives thereof;

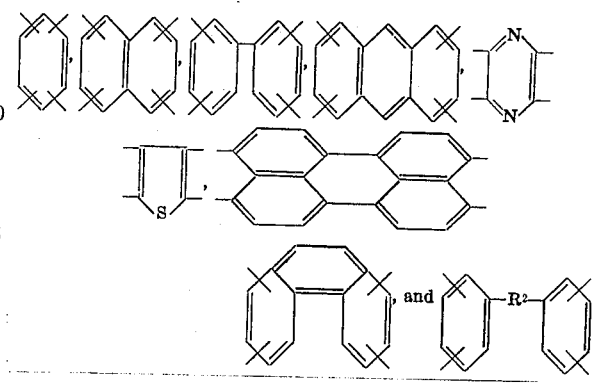

where $R^2$ is alkylene of 1–3 carbon atoms, oxygen, sulfur, or one of the following:

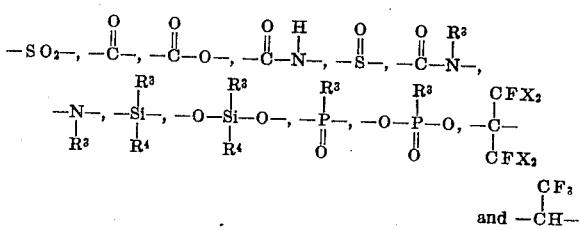

wherein R³ and R⁴ are alkyl or aryl, and substituted groups thereof, and each X is separately chosen from the group consisting of F and Cl, the said R being such as obtained from a dianhydride of the formula

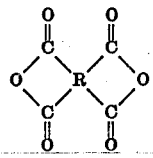

where R has the same meaning as above; and where R¹ is a divalent aromatic radical (arylene), preferably one of the following groups: phenylene, naphthylene, biphenylene, anthrylene, furylene, benzfurylene, and

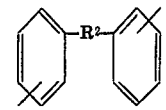

wherein R² is as defined above.

* * * * *

PO-1050
(5/69)

UNITED STATES PATENT OFFICE
CERTIFICATE OF CORRECTION

Patent No. 3,642,569              Dated February 15, 1972

Inventor(s)            Clare William Gerow

It is certified that error appears in the above-identified patent and that said Letters Patent are hereby corrected as shown below:

Column 12, line 11, "claim 2" should read --claim 3--; line 13, "claim 3" should read --claim 4--; line 16, "claim 2" should read --claim 3--; line 19, "claim 5" should read --claim 6--; line 25, "claim 6" should read --claim 7--; line 27, "claim 7" should read --claim 8--.

Signed and sealed this 12th day of September 1972.

(SEAL)
Attest:

EDWARD M. FLETCHER, JR.
Attesting Officer

ROBERT GOTTSCHALK
Commissioner of Patents